(12) United States Patent
Kuhlmann

(10) Patent No.: US 6,902,472 B2
(45) Date of Patent: Jun. 7, 2005

(54) DASHBOARD ARRANGEMENT FOR A MOTOR VEHICLE

(75) Inventor: Rainer Kuhlmann, Bietigheim-Bissingen (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 228 days.

(21) Appl. No.: 10/347,699

(22) Filed: Jan. 22, 2003

(65) Prior Publication Data

US 2003/0157876 A1 Aug. 21, 2003

(30) Foreign Application Priority Data

Jan. 22, 2002 (DE) .......................................... 102 021 69

(51) Int. Cl.[7] .................................................. B60S 1/54
(52) U.S. Cl. ......................... 454/121; 165/42; 454/152
(58) Field of Search ................................ 454/121, 127, 454/128, 129; 165/41, 42

(56) References Cited

U.S. PATENT DOCUMENTS 5,979,965 A 11/1999 Nishijima et al.

FOREIGN PATENT DOCUMENTS

FR 2725404 4/1996
FR 2796577 1/2001

Primary Examiner—Derek S. Boles
(74) Attorney, Agent, or Firm—Crowell & Moring LLP

(57) ABSTRACT

A control panel arrangement is provided for a motor vehicle in which the control panel arrangement includes a lower part and an upper part between which a first and second air circulation channel are constructed. The channels extend at least in some segments approximately transversely to the vehicle direction and run at least regionally parallel to each other and are separated from each other by a channel wall and furthermore lead to first and second air outlets arranged at least in the region of lateral ends of the control panel arrangement. The second air circulation channel is continued upstream from the second air outlet allocated to it at least in segments inside the first air circulation channel with a channel extension for a compact design of the control panel arrangement.

12 Claims, 2 Drawing Sheets

DASHBOARD ARRANGEMENT FOR A MOTOR VEHICLE

BACKGROUND OF THE INVENTION

The present invention relates to a control panel arrangement for a motor vehicle, and more particularly, to a control panel arrangement which encompasses a lower part of the control panel and an upper part of the control panel between which a first and second air circulation channels are constructed, wherein said channels extend at least in segments approximately transversely to the vehicle direction and run at least regionally parallel to each other and are separated from each other by a channel wall and moreover lead to first and second air outlets arranged at least in the region of side ends of the control panel arrangement.

A known control panel arrangement for a motor vehicle is described in WO 97/49599 A1. This instrument panel arrangement possesses a lower part of the control panel as well as an upper part of the control panel between which a first and a second air circulation channel are constructed. These air circulation channels extend at least segment-wise approximately in a direction crosswise to the motor vehicle and run at least regionally parallel to one another, whereby they are separated from one another in their parallel regions by a channel wall. The first and second air circulation channels correspondingly lead to first and second air outlets, which lie in the region of lateral ends of the control panel arrangement. The ends of the control panel arrangement lie adjacent to the lateral structure, e.g., A columns. The disadvantage with this known control panel arrangement is the relatively large space requirements for the air circulation channels arranged one alongside the other, or (viewed in the direction of travel) one behind the other.

SUMMARY OF THE INVENTION

An object of the present invention is to provide a control panel arrangement for a motor vehicle, with a compact design.

This objective has been accomplished with a control panel arrangement for a motor vehicle in which the second air circulation channel is continued upstream from the second air outlet associated therewith at least in segments inside the first air circulation channel with a channel extension.

Among the chief advantages obtained with the present invention are to be seen in the fact that, owing to the extension of the second air circulation channel inside the first air circulation channel, for example in the region of the ends of the control panel arrangement, the latter has a compact construction. The first and second air outlets can moreover be brought up as close as possible to the side ends of the control panel arrangement so that, for example, the second air outlets lie very near the side windows of the motor vehicle owing to which they can be acted upon by air effectively and directly in order in this way to avoid fogging of these side windows. Due to the extension of the second air channel in the first air channel, additional installation space is moreover gained for attachments or outfitting elements of the control panel arrangement.

In a currently preferred embodiment, due to the fact that in each case separate channels are provided, on one hand, for interior ventilation of the vehicle and, on the other hand, for subjecting the vehicle windows to air action, these air circulation channels can be supplied with variously conditioned air. Specially prepared air for acting upon the vehicle windows can be conducted thereto, for example to avoid fogging. Ventilation of the interior that is comfortable for vehicle occupants can now also take place.

According to a further refinement, a comparatively larger space for installations is made available on the driver or front seat passenger side through the construction of the ventilation channel with an arc section and the arrangement of the channel extension in the arc section of the ventilation channel. The space accommodates, for example, an instrument panel, with (if need be) indicator devices, or a glove compartment, a safety device or other installation or attachment elements.

In another embodiment, the channel extension is formed by an insertion element, which is placed into the first ventilation channel, thereby enabling simple and economical assembly. The air flowing out of the air opening provided in the channel wall is consequently passed over the inserted element to the second air outlet.

The channel extension can be particularly simply realized with the insertion element if the second air circulation channel is formed in the lower part of the control panel by U-shaped channel elements or, alternatively, by groovelike channel elements, which are open on their side facing the upper part of the switch board. After installing the insertion element, the air circulation channels are covered or closed off by the upper part of the control panel.

If the air opening lies approximately in the transition region between the segment running parallel to the transverse direction of vehicle and arc segment of the first air circulation channel, then this first air circulation channel can thus be passed with its arc segment near the side end of the control panel arrangement. The insertion part can be arranged in the arc segment, owing to which a stacked arrangement of the first and second air circulation channels results in the region of this arc segment and accordingly the first and second air outlets are arranged one above the other in the region of the side ends of the control panel arrangement.

A design variation locates the side defrost outlet on the upper side and the side outlet on the face facing the passenger compartment. This arrangement avoids the lateral ventilation outlets blowing directly on the vehicle occupants and nonetheless an effective action of air from the defrost outlets onto the side windows of the motor vehicle can take place.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
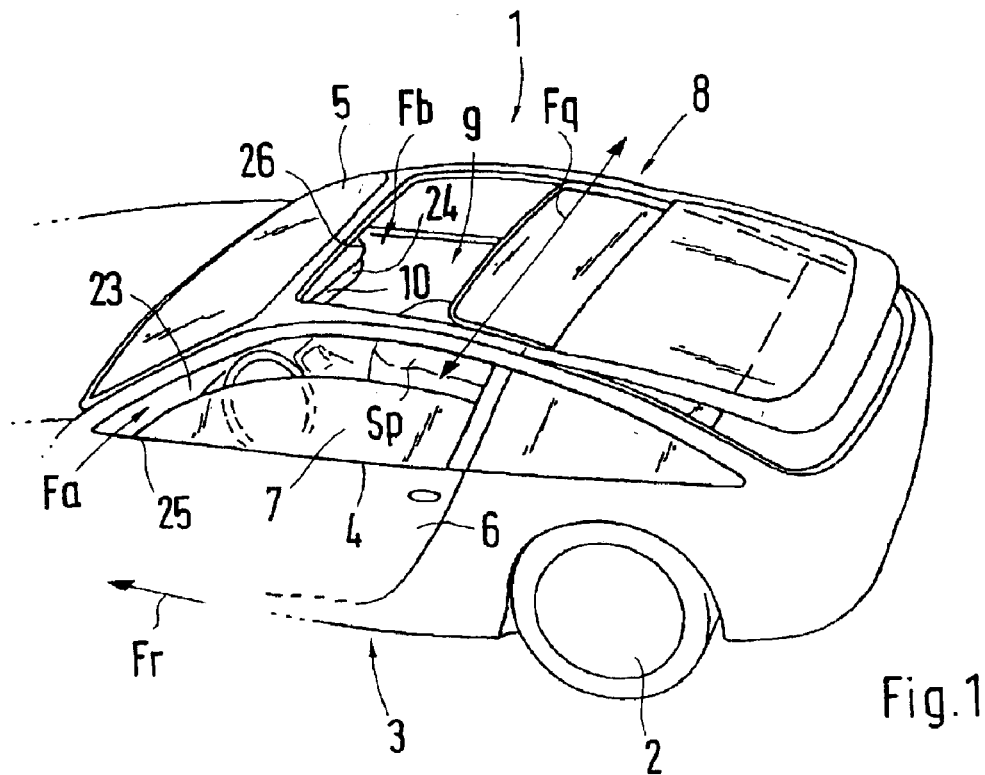
FIG. 1 is a perspective partial view of a motor vehicle.

In FIG. 1, a motor vehicle 1, especially a passenger car, has a body 3 borne by wheels 2. The motor vehicle 1 has a front window 5 also designated as a windshield above belt line 4 and side windows 7 arranged on side doors 6. Of course, it is also possible to outfit the motor vehicle with more than two side doors 6, which can likewise bear side windows. Furthermore, the body 3 above the belt line 4 is outfitted with a motor vehicle roof 8, which can be constructed fixed or movable for opening or closing the roof. Moreover, the motor vehicle includes a motor vehicle interior 9, in which seats Sp are arranged. A control panel arrangement 10 is arranged in the interior 9 in the travel direction Fr in front of the seats Sp in a known manner and can be fastened to the body 3.

The control panel 10 includes, for example, a lower part of the control panel 11 (FIG. 2) manufactured of plastic in one piece, which can also be designated as the control panel carrier. A fastening support 12, for example for a heating and/or air conditioning device (not represented), can be constructed on the lower part of the control panel 11. Of course, further fastening supports 12 for further attachments, such as, for example, interior outfitting elements or occupant protection apparatus, can be provided. The lower part of the control panel 11 preferably possesses a frame-like configuration with lower diagonal trussing 13 for fastening the aforementioned elements and upright outer struts 14 and 15 connected with the trussing 13 as well as at least one central strut 16. An upper cross element 17 connects to the struts 14, 15 and 16 at a distance to the lower diagonal trussing 13. At least a first and second air circulation channel 18, 19 are constructed for each vehicle side Fa and Fb on the lower part of the control panel 11, especially in the region of the cross element 17, which are formed (when viewed in cross section) by approximately U-shaped (FIG. 3) or groove-like channel elements 20 or 21, the upper side Os of which is covered or closed off by an upper part of the control panel 22. Thereby, the first and second air circulation channels 18 and 19 are located between the lower part 11 of the control panel and the upper part 22 of the control panel.

The upper part 22 of the control panel which, for example, is manufactured in multiple parts and if need be of plastic, has an approximately horizontal section oriented approximately in the direction toward the front window 5. That section forms an upper side 23 of the control panel arrangement 10. Furthermore, the upper part of the control panel 22 includes a drawn-down section, which faces the vehicle interior 9 or the seating places Sp and thus forms a face 24 of the control panel arrangement 10. Air outlets are provided in the control panel arrangement 10 in the region of its side ends 25 and 26, whereby the first air circulation channel 18 leads to these first air outlets 27 and 28 (also designated as side outlets), respectively, and the second air circulation channel 19 leads to the second air outlets 29 and 30, respectively. The first and second air circulation channels 18 and 19 allocated to each motor vehicle side Fa and Fb can, for example, extend from an air diffuser 31 arranged approximately centrally in the lower part of the control panel 11, which is in particular supplied by the heating and/or air conditioning device or ventilator. In addition, third air circulation channels 32 which extend from the air diffuser 31, can lead to third air outlets 33 and 34, which are in particular arranged as so-called middle outlets. The first air outlets 27 and 28 as well as the third outlets 33 and 34 serve especially for ventilation or conditioning the vehicle interior 9, and thus form ventilation outlets for the region of the vehicle interior 9, which vehicle occupants take up. The first and third air circulation channels 18 and 32 are therefore ventilation channels for the vehicle interior 9 and can be supplied separately by the heating and/or air conditioning device or ventilator. The second air circulation channels 19 are used as defrost channels, which preferably likewise can be supplied separately by the heating and/or air conditioning or ventilator in order to furnish specially conditioned air to the second air outlets 29 and 30—also designated as defrost outlets—for air action upon the motor vehicle windows 7, owing to which fogging is avoided or eliminated. For defrost air action on the front window 5, fourth defrost or air outlets 35 and 36 can furthermore be constructed on control panel arrangement 10, which are supplied from the defrost channels 19.

Figure 2:
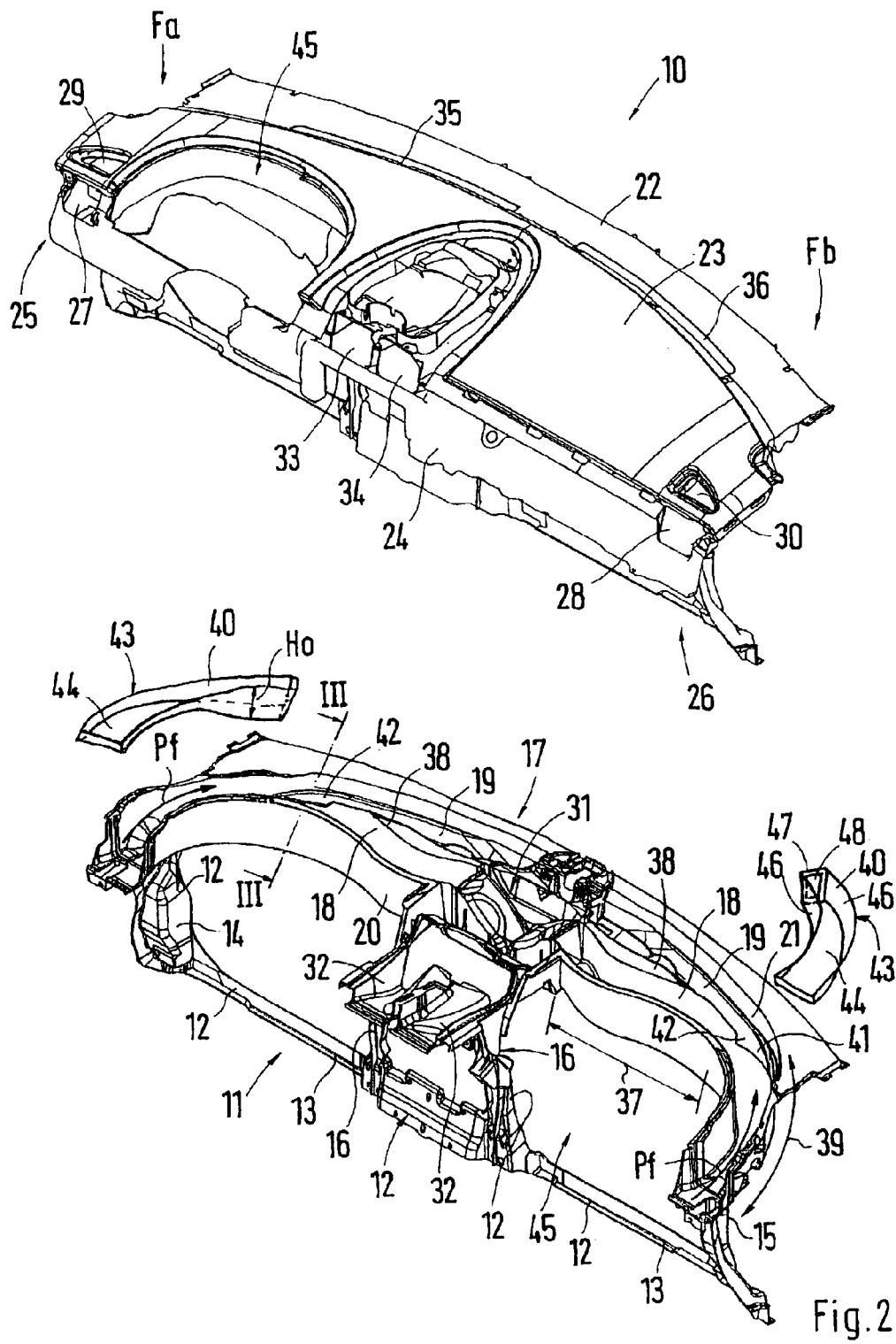
FIG. 2 is an exploded perspective view of a control panel arrangement for the motor vehicle in accordance with the present invention.

FIG. 2 in addition shows that the first and second air circulation channels 18 and 19 extend at least segment-wise (extending from air diffuser 31) approximately crosswise toward the vehicle direction Fq and in particular run one after the other (viewed in direction of travel Fr) in this segment 37 and at least regionally parallel toward one another, but are separated from one another by a channel wall 38. An arc segment 39 is joined to section 37 of each ventilation channel 18, wherein the arc segment continues the ventilation channel 18 against the travel direction Fr. FIG. 2 moreover shows that the second air circulation channel 19, which is also designated as the defrost channel, initially ends approximately in the transition region between section 37 and the arc segment 39 in the lower part 11 of the control panel. Nonetheless, in order that the second air outlets 29 and 30 can be supplied from the defrost channel 19, a channel extension 40 is constructed in each first air circulation channel 18, connecting the channel end 41 of the defrost channel 19 with the respective lateral defrost outlet 29 or 30. Consequently each defrost channel or second air circulation channel 19 is continued at least in some segments inside the respective first air circulation channel 18, especially in its arc segment 39, and accordingly extends in some segments (viewed from the second air outlets 29 and 30) upstream (arrow Pf) preferably up to section 37 of channels 18 or 19. The channel extension 40 could, if need be, reach up into section 37 or up to air diffuser 31.

In the transition region between section 37 and arc segment 39, an air opening 42 is constructed in channel wall 38, which is allocated to channel end 41. The channel extension 40 is joined to air opening 42 or channel end 41, with the extension 40 being formed by an insertion element 43 in a currently preferred embodiment which can, for example, be constructed groove-like, but at least has a floor 44 which in the illustrated embodiment separates the first air circulation channel 18 from the second air circulation channel 19 in the region of the arc segment 39 so that these two air circulation channels 18, 19 lie one over the other or one inside the other at least in some segments. Channels 18, 19 (as viewed in the travel direction Fr) are arranged one behind the other in section 37. A compact construction of the control panel arrangement 10 results through the arc-like guidance after the channel section 37 and the stacked arrangement of the two channels 18, 19 in the arc segment 39, thus offering (if need be larger) installation spaces 45 for installation or attachment elements.

Figure 3:
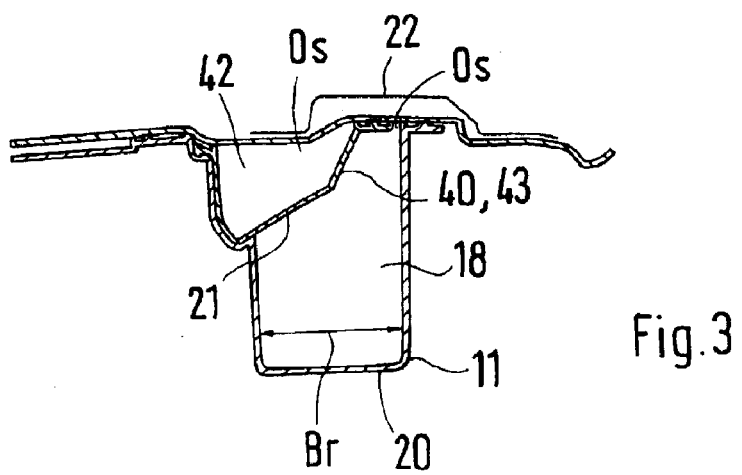
FIG. 3 is a cross-sectional view along line III—III of the control panel arrangement shown in the lower part of FIG. 2.

As is apparent from FIGS. 2 and 3, for example, the channel extension 40 or insertion part 43 can have a basically U-shaped cross section and can extend regionally or over the entire breadth Br (FIG. 3) of the first air circulation channel 18. Moreover, the height Ho of the sidewalls 46 of the insertion element 43 can rise (increase) upstream. Furthermore, the insertion element 43 can be constructed vat-like and connect with the air outlet opening 42 with a passage 48.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A control panel arrangement for a motor vehicle configured to encompass a lower part of a control panel and an upper part of the control panel between, comprising first and second air circulation channels arranged between the lower and upper parts, said air circulation channels extending at least in segments approximately transversely to the vehicle direction and running at least regionally parallel to each other, and a channel wall separating the air circulation channels from each other and with the air circulation channels extending toward respective first and second air outlets arranged at least in side end regions of the control panel arrangement, wherein the second air circulation channel is continued upstream from the second air outlet associated therewith at least in segments inside the first air circulation channel by way of a channel extension adjoining an end of the second air circulation channel.

2. The control panel arrangement according to claim 1, wherein the first air circulation channel is configured as a ventilation channel for an interior portion of the motor vehicle, the first air outlet is at least one side outlet, the second air circulation channel is configured as a defrost channel for having air act upon motor vehicle windows, and the second air outlet is at least a lateral defrost outlet for a side window of the motor vehicle.

3. The control panel arrangement according to claim 2, wherein the defrost channel and the ventilation channel are arranged one after the other, as viewed in a travel direction of the motor vehicle, in a section thereof extending parallel to a transverse direction of the motor vehicle, an arc segment is joined to the section of the ventilation channel which extends against the travel direction, and the channel extension is located in the arc segment of the ventilation channel.

4. The control panel arrangement according to claim 1, wherein the channel wall has an air passage opening, an insertion element arranged in the first air circulation channel constituting the channel extension of the second air circulation channel in the first air circulation channel, and the channel extension is configured to join the air passage opening and open into the second air opening.

5. The control panel arrangement according to claim 1, wherein the air circulation channels are, at least in some segments, constituted by channel elements having a U-shape configuration in a lower part of the control panel and being covered by the upper part of the control panel.

6. The control panel arrangement according to claim 5, wherein the first air circulation channel is configured as a ventilation channel for an interior portion of the motor vehicle, the first air outlet is at least one side outlet, the second air circulation channel is configured as a defrost channel for having air act upon motor vehicle windows, and the second air outlet is at least a lateral defrost outlet for a side window of the motor vehicle.

7. The control panel arrangement according to claim 6, wherein the defrost channel and the ventilation channel are arranged one after the other, as viewed in a travel direction of the motor vehicle, in a section thereof extending parallel to a transverse direction of the motor vehicle, an arc segment is joined to the section of the ventilation channel which extends against the travel direction, and the channel extension is located in the arc segment of the ventilation channel.

8. The control panel arrangement according to claim 5, wherein the channel wall has an air passage opening, an insertion element arranged in the first air circulation channel constituting the channel extension of the second air circulation channel in the first air circulation channel, and the channel extension is configured to join the air passage opening and open into the second air opening.

9. The control panel arrangement according to claim 4, wherein the air passage opening is arranged approximately in a transition region between the section running along a transverse direction of the vehicle travel direction and the arc segment.

10. The control panel arrangement according to claim 2, wherein the lateral defrost outlet is located at the upper side and the lateral outlet is located at the face of the control panel arrangement facing a passenger compartment of the motor vehicle.

11. The control panel arrangement according to claim 10, wherein the defrost channel and the ventilation channel are arranged one after the other, as viewed in a travel direction of the motor vehicle, in a section thereof extending parallel to a transverse direction of the motor vehicle, an arc segment is joined to the section of the ventilation channel which extends against the travel direction, and the channel extension is located in the arc segment of the ventilation channel.

12. The control panel arrangement according to claim 11, wherein the channel wall has an air passage opening, an insertion element arranged in the first air circulation channel constituting the channel extension of the second air circulation channel in the first air circulation channel, and the channel extension is configured to join the air passage opening and open into the second air opening.

* * * * *